Sept. 21, 1965 W. R. JOHNSON 3,207,854

NOISE REDUCTION METHOD FOR RECORDED SIGNALS

Filed Aug. 30, 1960 2 Sheets-Sheet 1

INVENTOR.
WAYNE R. JOHNSON

BY Lippincott & Smith

ATTORNEYS

Sept. 21, 1965 W. R. JOHNSON 3,207,854

NOISE REDUCTION METHOD FOR RECORDED SIGNALS

Filed Aug. 30, 1960 2 Sheets-Sheet 2

INVENTOR.
WAYNE R. JOHNSON

BY Lippincott & Smith

ATTORNEYS

United States Patent Office 3,207,854

Patented Sept. 21, 1965

3,207,854

NOISE REDUCTION METHOD FOR RECORDED SIGNALS

Wayne R. Johnson, Los Angeles, Calif., assignor to Minnesota Mining and Manufacturing Company, St. Paul, Minn., a corporation of Delaware Filed Aug. 30, 1960, Ser. No. 53,594

15 Claims. (Cl. 179—100.2)

This application is a continuation-in-part of copending application Serial No. 619,142, filed October 30, 1956, now abandoned, by me for "Noise Reduction Method for Recorded Signals."

This invention relates to the recording of electrical signals on and their reproduction from moving media, whether the record be imposed upon the media by photographic, mechanical or electrical means. It is, however, particularly adapted to the recording of signals occupying a very wide frequency band, such as television signals, on magnetic tape and will be described particularly in connection with that application.

It is well recognized that all systems of recording now in general use are limited as to the band of frequencies that they will reproduce from the recording medium. The low frequency limit or cut-off differs as between the various systems of recording. The high frequency cut-off is a function of the size of the reproduction instrumentality (and usually of the recording instrumentality as well) in relation to the speed with which the record moves with respect to it. The instrumentality referred to may be the needle of a mechanical reproducer, the width of the image of an optical slit in photographic reproduction, or the width of the gap in a magnetic transducer head. When the size of any of these instrumentalities, measured along the length of a record track, becomes equal to the recorded wavelength of the signals to be reproduced the response of the reproducer becomes zero. As this frequency of absolute cut-off is approached the energy of the reproduced signals falls off very rapidly and nearly linearly.

In magnetic recording the low frequency cut-off is ascribable to the fact that the amplitude of the reproduced signals is proportional to the rate-of-change of the magnetism imposed upon the record, so that at these low frequencies, where the rate-of-change is low, response is also low.

In order to obtain accurate reproduction of the recorded signals the amplifiers used in recording, reproduction, or both, are equalized so that their over-all frequency characteristics is complementary to that of the recording-reproducing system per se. Where the response of the transducer heads that accomplish the actual transfer of the signal to and from the recording medium becomes very low, high degrees of amplification must be employed.

All systems of recording, reproduction, and amplification, are subject to a certain amount of random noise. This may result from inequalities in the reproducing medium, dust that has collected on its surface, or other chance defects, but the most important source of such noise lies in the amplifier itself. This includes resistance noise due to the thermal agitation within the resistive materials, and shot noise due to the statistical variation in the emission of electrons from the hot cathodes of electron tubes.

Experience has shown that the noise from all of these sources is distributed substantially uniformly throughout the band of frequencies involved. Reproduction becomes unsatisfactory when the general noise level approaches in amplitude that of the signals to be reproduced. In reproduction, however, the noise is amplified together with the signals. In follows that although the noise level may be very low in comparison with the average amplitude of the signals, as the upper and lower cut-off frequencies of the apparatus are approached, where the signals themselves require very high degrees of amplification, the signal-to-noise ratio of the reproduced signals falls off and the apparent noise is therefore concentrated in the upper and lower portions of the band, where the greatest degree of equalization is required.

Whether it is the high-frequency or the low-frequency noise, or both, that present the greatest difficulty depends upon the particular type of signal to be reproduced. In the reproduction of television signals, comprising a band extending theoretically from zero to 4 mc., the periodic transmission of black-level signals at the end of each line and frame traced in scanning the image permits the use of D.C. restorers, which make unnecessary the recording of the extreme low frequencies. Therefore it is the high frequency noise that is most troublesome, and hence this specification will be directed primarily to the improvement of the signal-to-noise ratio at the high-frequency end of the band, but it should be apparent to those skilled in the art that the same techniques can be used for the correction of low-frequency noise.

The high frequency components of a television signal can be divided into two general categories. The first comprises the high-frequency components developed by scanning a portion of the field wherein there is a sudden change in light level, developing a "step-function" signal. This develops a frequency spectrum, extending theoretically to infinity and actually to the upper limit of the transmitted band, wherein the amplitudes of the various components are inversely proportional to the frequency. The second category of high-frequency components is developed by scanning a portion of a picture field wherein there is a high degree of detail, such as might be developed, for example, in scanning the silhouette of a picket fence. In this latter case the resultant signals might comprise almost entirely high-frequency components of large amplitudes. In general, however, such detail represents relatively small changes of illumination, superposed on a fairly expansive background, and the high frequency components are at a relatively low level and subject to being obscured by interferent noise that would not be noticed in comparison with higher amplitude signals. Furthermore, in large areas of nearly uniform light level the noise itself becomes more evident than in areas carrying detail, showing up in the reproduced picture as "snow."

In the recording of television signals it is always desirable to extend the reproducible band of frequencies as far as possible into the high-frequency range. This is true whether or not band-splitting methods are employed, for even with such methods the speed of the tape is very high in comparison with that used for the recording of sound and the amounts of tape used are very large. Furthermore, any reduction of record speed by such methods increases the number of channels that must be recorded and hence the cost and complexity of the recording and reproducing equipment. Therefore, even though such methods are employed it is still desirable to use each channel to the utmost possible degree. Moreover, such methods all involve the problem of exact phase relationship between the signals recorded on the respective tracks.

The primary object of the present invention is to provide methods and apparatus for improving the signal-to-noise ratio in reproduced signals wherein the interferent noise is concentrated in a particular portion of the frequency band. To this end, other objects of the invention are to make such improvements in signal-to-noise ratio possible without disturbing the phase relationship between the various frequency components; that is applicable to any method of recording and reproduction, including both direct recording and band-splitting and that does not require continuous adjustment of the apparatus employed, thus requiring high operating costs or attention by skilled personnel. Further objects of the invention, particularly as applied to the reproduction of television signals, are to provide a method of and apparatus for the reduction of signal-to-noise ratio which is effective in reducing noise as it appears in the scanning of relatively large areas of uniform, low illumination and which is applicable to and simplifies the recording and reproduction of the "mixed highs" as they are employed in the transmission of color television signals. A still further object is to provide a method and apparatus for the purpose described that minimizes the effects of "ringing" introduced by the necessarily sharp high-frequency response of the equalizing circuits.

In accordance with the present invention the signals to be recorded are separated by a suitable filter network into at least two bands or ranges, one of which can be characterized as the "noisy range" and the other as the "relatively quiet range." In the recording of television signals the cross-over point of the filter network may be the point where the reproduced signals have dropped to one-half their maximum energy level, i.e., 3 db down, although the actual point of separation is not critical. The signals in the noisy range are passed through a non-linear amplifier wherein the instantaneous amplitude of the output signal is proportional to a fractional power of the instantaneous amplitude of the corresponding input signal. The resultant output signal will be related to signals of like amplitude in the relatively quiet range by a factor of proportionality that is the product of a constant times the original amplitude to some fractional power. The noisy-range signals, thus amplified, are then recombined with the signals of the other bands in an adding circuit and the combined signals are recorded. In a color television system the signals in the noisy range may be the mixed highs and they may be added to all three component color signals or to but one.

In reproduction the signals thus recorded are picked up by the usual playback transducer, are preamplified and, preferably, equalized at this point, so that signals up to the ultimate cut-off frequency are reproduced at the same relative levels as those at which they were recorded. Following the equalization the signals are then separated into two channels carrying, respectively, the same two frequency ranges as those into which they were divided in recording. The signals in the noisy range are then passed through a non-linear amplifier or network whose characteristics are the inverse of that used in the recording process; i.e., the output signals bear a relation to those in the input channel which is the equivalent to a multiplication of the input to the distorting network by a factor wherein their instantaneous amplitudes are raised to a power that is the reciprocal of the fractional power used in recording multiplied by the reciprocal of the proportionality constant employed in the first distortion. The signals in the two channels are then added to comprise the restoration of the original signal. In color television, if the mixed highs have been added to all component color channels in recording, they are added back individually in reproduction. If they have been recorded on only one channel, the signals from this channel may be added to all of the others at this point, after reproduction. Each of these practices has some advantages; if added to all channels in recording there will be a further statistical reduction in the noise level, by a factor of $1/\sqrt{3}$ since three channels are involved. On the other hand (since it is the very high frequencies that are here most important), the phasing problem, when the signals are recombined, may counterbalance the advantages gained by the further reduction of noise. Furthermore, which system is used depends to some extent upon how the signals are to be employed immediately following their reproduction.

The amount of noise reduction that can be accomplished by the procedure thus outlined depends upon both the proportionality factor with respect to linearly amplified signals and upon the reciprocal exponents of the non-linear amplifiers employed in the recording and reproducing processes respectively. Apparatus considerations lead to the use of square-root and square amplifications, although smaller exponents in recording and larger ones in reproduction would give additional reduction in relative noise. The high-frequency components are superimposed upon those of low frequency. Those of greatest amplitude usually, but not always, occur at the initiation of step functions resulting from the scanning of sudden changes in brightness and their maximum amplitude occurs where the low frequency component amplitudes are minimal.

The dynamic range of any recording medium is limited and it is almost always desired to utilize it to the utmost. The desirable relationship, in recording, is therefore that at which the maximum amplitude of the non-linear signal is substantially equal to the maximum amplitude of those same signals before non-linear amplification. The maximum change to be recorded in a television signal (exclusive of synchronizing signals) is from complete light to complete black. The maximum amplitude high frequency signals to be recorded represent a change of this range, and if the change represents a step-function, the amplitude of the signal representing the sum of the high frequency components will be equal to the amplitude of the lowest or fundamental frequency of the step. Therefore, for greatest utilization of the dynamic range of the recording medium, the output of the non-linear amplifier in the noisy channel should be so adjusted that if $A_0$ is equal to the maximum of a signal representing the transition from black to white, as it appears in the output of the relatively quiet channel, the amplitude of a signal in the output of the non-linear channel that represents a change of the same magnitude should be represented by the equation $$bA\frac{1}{n}=A_0$$

where $b$ is the constant of proportionality and $1/n$ is the fractional exponent. Similarly, in the output of the non-linear amplifier in the reproducing apparatus the relationship should be $$\frac{1}{b}A^n=A_o$$

Although this relationship leads to the maximum utilization of the recording medium and maximum signal-to-noise ratio, it is not a necessary condition for the practice of the method, the only necessary requirement being that the constant factor in the reproducing amplifier be the reciprocal of that in the recording non-linear amplifier and that the exponents of the amplitude functions also be reciprocal.

If the conditions for maximum utilization of the dynamic range is met and the maximum signal amplitude is taken as unity, the constants $b$ and $1/b$ also become unity and can be disregarded in the consideration which follows. As has been indicated above the amplifiers in the reproducer are the principal source of noise, and for the purposes of this discussion can be considered the only source. At the terminals of the playback head the noise level may be from 40 to 60 db down in comparison with $A_0$, an amplitude ratio of from $1/100$ to $1/1000$. Taking the lower ratio and considering a signal in the noisy band which, before non-linear amplification has an amplitude equal to the noise level, or $0.01A_0$, the amplitude of this same signal, at the output of the recording non-linear amplifier will have a relative amplitude of $0.01A_0$, at which level it will be reproduced 20 db above the noise level. This assumes, of course, that the noise level is measured after equalization.

If signal and noise were completely independent, the signal level of 0.1, squared, would appear at its original amplitude of $0.01A_0$ while the noise would appear at $0.0001A_0$, $\frac{1}{100}$ of this amplitude or 40 db down. The noise, however, being random, may ride on top of the signal, giving an instantaneous amplitude of $0.11A_0$, which, squared, gives an amplitude of 0.0121, or a noise component of about 1/5 of the amplitude of the entire signal. This, however, means that instead of the signal being entirely submerged in the noise it appears about 14 db above the noise level.

The advantage obtained by dividing the band into a noisy range and a quiet range and non-linearly amplifying only the former also derives from the fact that the noise rides on top of the low-frequency signals and that the non-linear amplifier responds to the over-all amplitude. This is illustrated by the case where a large area of substantially maximum amplitude, approaching black, is being scanned. The amplitude of the overall signal is then unity. If the non-linear amplification were applied to the entire signal, with a noise level at the assumed value of $0.01A_0$, the instantaneous amplitude of the overall signal would then vary between $0.99A_0$ and $1.01A_0$. Subjected to the squaring operation these values become, very nearly, 0.98 and 1.02, the noise contribution being approximately doubled instead of being greatly reduced. Using the band separation process of this invention the variation in amplitude of the black-area signal, due to noise, would be $\pm 0.0001A_0$, a difference in noise of 46 db.

One of the advantages of this invention, which may not be at once apparent, is that it greatly reduces the amplitude of ringing resulting from the sharp cut-off of the equalizing circuitry used for building up the high-frequency response of the system in the vicinity of the the cut-off. Such ringing is most apparent on sudden changes of polarity or amplitude, and the amplitude of the ringing itself is proportional to the change.

It is the characteristic of the non-linear amplifier that the lower the amplitude of a signal the less its amplification, and since the ringing is always of lower amplitude than the change the result is always a further reduction in amplitude. Thus, with a square-law amplification a ringing of 10% is reduced to 1%.

In the above description, and throughout this specification the term "instantaneous amplitude" means the absolute instaneous magnitude of the voltage (or current) of the signal, without regard to sign, positive or negative as the case may be. It is not the signal, as such, that is raised to a fractional power in recording and to a power greater than unity in reproduction; if it were, the reciprocal powers were, say 0.5 and 2, the sign of the recorded signal would be indeterminate and that of the reproduced signal always positive, whereas in fact each signal as recorded or reproduced changes in sign concurrently with the signal to which the non-linear amplification is applied. The "magnitude" of the signal would imply its power, which is not the parameter directly operated upon and which is always either positive or zero. Therefore, although strictly speaking "amplitude" means the maximum value of the voltages or currents considered, "instantaneous amplitude" appears to be the most appropriate term for the parameter to which it is herein applied. Furthermore, a circuit element or unit that will change the "instantaneous amplitude" in the required manner will necessarily change the maximum amplitude in like manner, and vice versa, and hence reference to "amplitude" is also proper in certain contexts.

A description of a preferred form of apparatus for carrying out the invention, which follows, is illustrated by the accompanying drawings, wherein.

Figure 1:
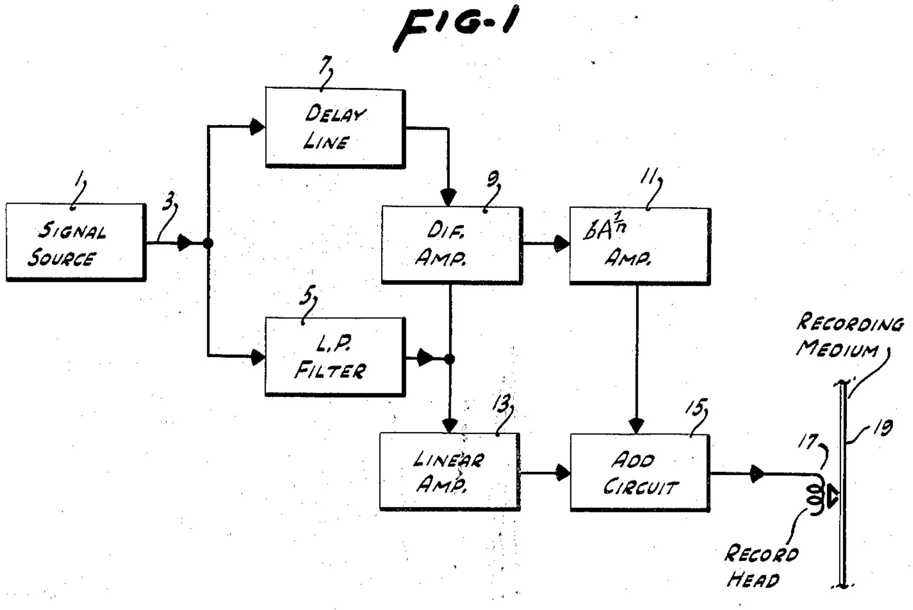
FIGURE 1 is a block diagram of apparatus for recording television signals in accordance with the method of this invention.

In the block diagram of FIGURE 1 the signal source 1 may be a television camera or, in certain instances, a television receiver. Its output, delivered to the line 3, may be either the complete signal, including D.C. components, or a similar signal from which the lowest frequency components have been removed by a blocking condenser, to be restored later in accordance with conventional practice. If the signals to be recorded are subjected to some form of band-splitting operation the source 1 would be the equipment in one channel wherein this operation is performed. In any event the ensuing apparatus will be the same or its equivalent.

Because the maintenance of accurate phase relationships is of highest importance in television signals, the separation of the signals into two channels, one of which carries the low frequencies and the other the high, the filtering network used for the purpose should be one in which the phase-delay is directly proportional to frequency. This is relatively easy with low-pass filters of the Gaussian type but is not so readily accomplished in high-pass filters. In the preferred arrangement, therefore, the output from the source 1 is applied to two channels, one of which includes a low-pass Gaussian filter 5, the other a delay line 7 which delays the entire band of signals by the same number of microseconds that the low frequencies are delayed in the filter 5.

The signals from the two channels are recombined in a differential amplifier 9, wherein the low-frequency components passed by the filter 5 are subtracted from the band as a whole, leaving only the high frequency components. These appear in the output of the differential amplifier and are supplied to the non-linear amplifier 11. At the same time, the signals from the filter 5 are fed to a linear amplifier 13. The outputs of these two amplifiers connect to an adding circuit 15 which may take any of several well known forms. One such form is a second differential amplifier, to which the signal from one of the two channels is fed in reversed phase, thus accomplishing the addition by the subtraction of negative quantities. The combined signals, representing both the linearly amplified, low-frequency components and the non-linearly amplified high-frequency components, are supplied to a conventional recording head or transducer 17, which imposes them on the recording tape 19 in the conventional manner.

In one equipment wherein the system here described is used a band-splitting method is employed which cuts the maximum frequency to be imposed on the record to one-half. As the television band is 4 mc. wide, the use of the band-splitting technique reduces the maximum frequency to be recorded and reproduced to substantially 2 mc. As these signals appear in reproduction at the terminals of the pick-up head, the cut-off frequency, 3 db down from the point of maximum response, occurs at approximately 1.2 mc., the response dropping sharply from this frequency to an absolute cut-off or zero response slightly above 2 mc. The equalizing circuits are sharply tuned to the 2 mc. frquency and cut off with extreme rapidity above this point. Accordingly, the band from 1.2 mc. to 2 mc. is that which constitutes the "noisy range" of the signals to be operated upon. The low pass filter 5 is therefore designed to cut off sharply at the 1.2 mc. frequency and because of the subtractive method used to obtain the frequencies within the noisy range the cross-over is perfect.

Figure 2:
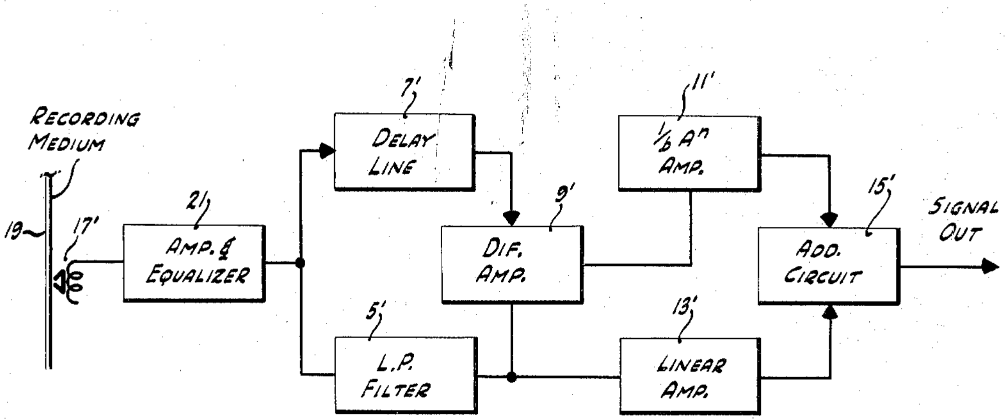
FIGURE 2 is a similar drawing of reproducing apparatus for signals recorded by the apparatus of FIGURE 1.

In the reproducing apparatus illustrated in FIGURE 2 the recording medium 19 is the same as that illustrated in FIGURE 1. Each step in the play-back operation has a corresponding step in recording, and requires equipment which is either identical to or the dual of equipment in the recording channel. To emphasize these relationships the corresponding elements in the play-back equipment of FIGURE 2 are designated by the same reference characters as those used in FIGURE 1 but distinguished by accents.

The signals recorded on the tape 19 are picked up by the transducer 17′, which may be identical with transducer 17 in construction and, in many cases, may be actually the same transducer. In playback the transducer connects first to amplifying equipment 21.

In a practical piece of equipment this amplifier will include several stages, which may or may not be contained in the same unit. Preferably all of the equalization of the reproduced signal is accomplished at this point, so that the signals delivered to the low-pass filter 5′ and the delay line 7′ comprise, substantially, the recorded frequencies at the same relative levels as those delivered to the recording transducer, plus, of course, the noise components traceable to the apparatus itself. Filter 5′ and delay line 7′ should be electrically identical with filter 5 and delay line 7, respectively, and the same is true of differential amplifier 9′. Since most equipment used for the recording of such signals is also used for playing them back, these electrically-identical elements will in many cases be actually the same pieces of equipment, transferred from recording to play-back use by suitable switching equipment. Linear amplifier 13 may also be of the same general character as the play-back amplifier 13′.

Amplifier 11′, however, exercises a reciprocal function from amplifier 11; instead of responding in proportion to the square root of the amplitudes input signal, it responds as their square. Elements 11′ and 13′ connect to the adding circuit 15′, the output whereof is a substantial reproduction of the signal recorded. In the case of the particular equipment heretofore referred to, the signal output goes to decoding equipment which reverses the band-splitting operation that preceded the recording, but as this is not pertinent to the particular invention herein described this ensuing apparatus is not shown.

In the equipment described the signals from the noisy channel are supplied to only one channel carrying low-frequency, relatively quiet signals. It should be evident that the high-frequency components from amplifier 11′ can go to more than one low-frequency channel, through individual adding circuits, but such circuits are not shown since they would merely complicate both drawings and description.

In the above description of the block diagram of FIGURES 1 and 2 the non-linear amplifiers 11 and 11′ have been described merely in terms of their function. Filters, delay lines, linear amplifiers and differential amplifiers, to say nothing of transducer heads, are so well known in the art that description of these elements is considered to be superfluous. Squaring and square-root extracting circuits are also known, although not so universally. Several circuits for producing squares and square roots, some of them more or less complex, are described in "Waveforms," vol. 19, Radiation Laboratory Series (McGraw-Hill, 1949), at pages 678 through 693, and it is there indicated that some of the circuits described may be used to extract cube roots. Any of the square-root extracting circuits can be used for amplifier 11, and, similarly, any of the squaring circuits can be used for amplifier 11′.

It is not necessary however, that the amplifier 11′ produce a signal that conforms exactly to an integral exponent, either the square or the cube, as long as the characteristic exponent of amplifier 11 is reciprocal. Neither is it necessary that $n$, the exponent in amplifier 11′ be as much as 2, as long as it is greater than unity, although the greater it can be made the greater will be the improvement in signal-to-noise ratio. These facts increase the flexibility of design of equipment for carrying out the method described above and hence the ease with which the fairly rigorous requirements of reciprocity between the two non-linear amplifiers may be met. In order to illustrate this fact suitable arrangement for performing the functions of these amplifiers are shown, respectively, in FIGURES 3 and 4.

Figure 3:
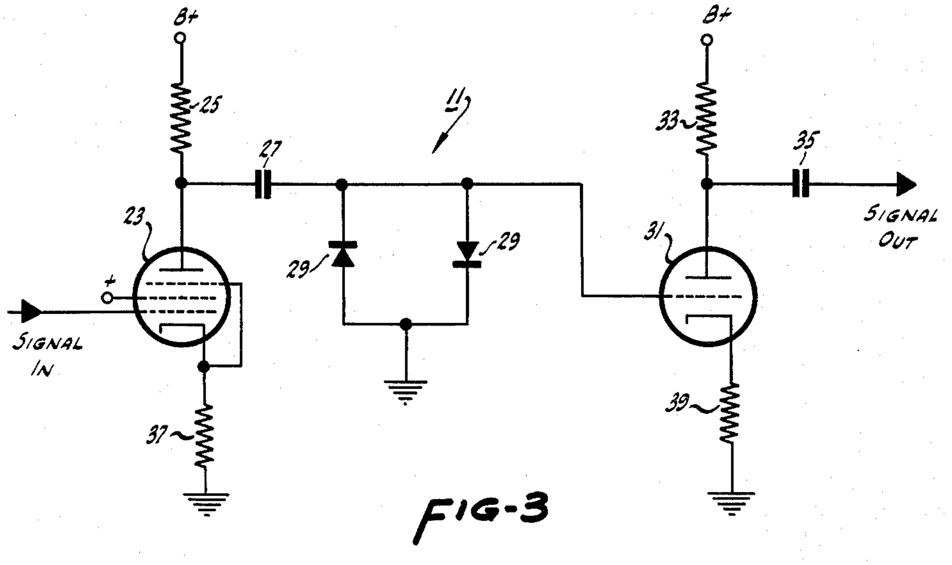
FIGURE 3 is a schematic diagram of an amplifier whose output amplitude is substantially proportional to the square root of the input signals and which is, therefore, suitable for use in the system here described.

In the arrangement of FIGURE 3 the signal from differential amplifier 9 is supplied to the grid of a pentode 23. It is characteristic of tubes of this class that their dynamic internal resistance is very high and that the current in the anode circuit can be made, over a reasonable operating range, directly proportional to voltage applied to the control grid. For the purpose of analysis, the impedance of the tube itself can, therefore, be considered as infinite, and its amplification, in terms of voltage, directly proportional to the impedance in its load circuit. In the handling of high frequency components this impedance cannot be made too great, for unavoidable shunt capacities inevitably attenuate the high frequencies. In the connection here used the anode and screen voltages are supplied from a conventional source, not shown, that to the anode being supplied through a resistor 25 of 3000 ohms, it having been found that with this value of plate resistor the output response is flat to above the 2 mc. cut-off frequency.

The load circuit branches off from the anode through a blocking condenser 27, large enough so that it will have negligible impedance in the frequency band between 1.2 and 2 mc. The load circuit itself comprises a pair of oppositely poled crystal rectifiers 29, bridged, in parallel, to ground. In the apparatus here described the rectifiers used are sold as "Hughes 1N191", these rectifiers having been found by experiment to be uniform in characteristics and to respond well to high frequencies. They are of the point contact type. The rectifiers 29 should be carefully matched in any event, since the characteristics of these devices are not yet as uniform as those of vacuum tubes. The high potential side of the two rectifiers connects to the grid of a further amplifier tube 31. The anode of tube 31 is supplied through the ordinary load register 33 from the same source as that of tube 23 and connection to the adding circuit 15 is through a blocking condenser 35. Tubes 23 and 31 are biased through the usual cathode resistors 37 and 39 respectively. These are not provided with bypass condensers, so that those tubes are somewhat stabilized by the resulting negative feedback.

It has long been known that the current passed by a crystal rectifier varies approximately as the square of the applied voltage and it, of course, follows that the voltage across such a rectifier varies as the square root of the current through it. Either of these statements is the equivalent of a statement that the effective resistance of the device varies as an inverse function of the voltage applied in the half of the cycle wherein they conduct. On the nonconducting half of the cycle the resistance varies in much the same way but is so much higher that in the present instance it can be neglected.

The impedance of each of the rectifiers 29 is materially lower than the impedance of resistor 25 at the level of signals having amplitudes approaching the noise level. To a first approximation it can therefore be considered that all of the signal current delivered by the tube 25 passes through these resistors and since the signal current from the tube is proportional to the input voltage, the voltage across the rectifier net which is delivered to tube 31 is that across the rectifiers. It is proportional to the square root of the signal voltage at the grid of tube 23, which is what is desired.

Actually, this is not quite true. With small signals, where the effective resistance of the rectifiers is high, a larger proportion of the current will be carried by resistor 25, since the current divides in inverse proportion to the resistance. Assuming that the rectifiers actually obey the square law relationship, the voltage supplied to the grid of tube 31 will not vary exactly as a square root function corresponding to an exponent of $A_0$ of 0.5, but to a somewhat larger exponent, which will nonetheless be materially less than unity. A similar change in effective exponent will occur if crystals are used following a cube or some other exponential law.

Satisfactorily to reconstruct the signal it is necessary that the non-linear amplifier 11′ follow as closely as possible in exact reciprocal relationship to that of amplifier 11. This can be accomplished by the use of a circuit which is substantially the dual of that used in amplifier 11, wherein resistances are replaced by conductances, currents by voltages, and vice versa.

Figure 4:
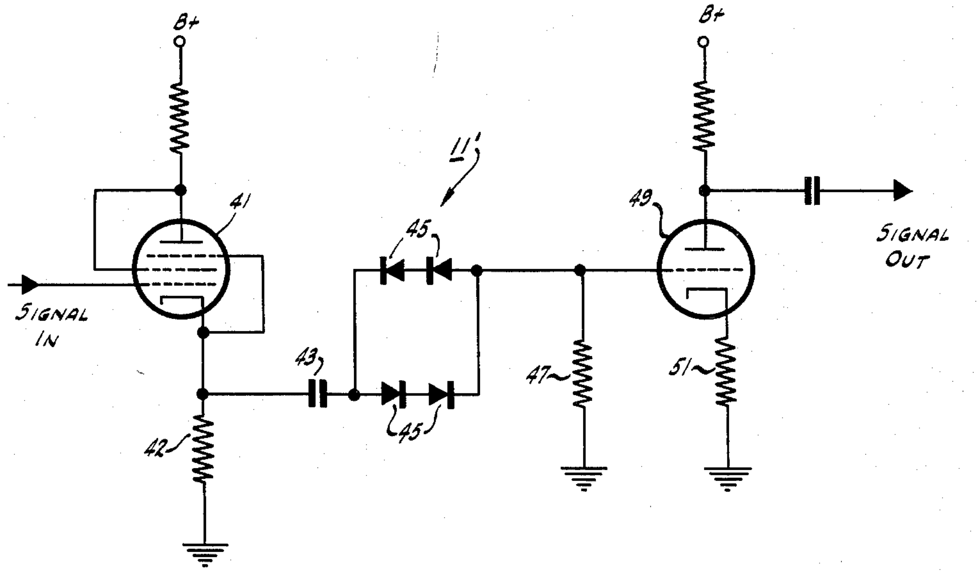
FIGURE 4 is a schematic diagram of an amplifier producing, in its output circuit, signals substantially proportional in amplitude to the square of the amplitude of the input signals.

Such an amplifier is shown in FIGURE 4. In this case the input tube 41, receiving the signal from the differential amplifier 9′, is connected as a cathode follower, the characteristics of which are that its effective output impedance is low and that the voltage at the cathode varies directly as the voltage of the grid, substantially independently of the current drawn, provided the impedance of the output circuit is relatively high in comparison with the impedance of the tube, instead of being low, as in the recording amplifier. Space current for the tube is supplied through a cathode resistor 42, of still higher impedance. The D.C. component of the output signal is removed by a blocking condenser 43, of negligible impedance to the frequencies used, which is followed by a pair of rectifiers 45, oppositely poled, but connected in series instead of in parallel with the output circuit. Following the pair of rectifiers the circuit connects to ground through a resistor 47, the high potential end of which connects to the grid of a final output tube 49. This last tube is biased through a resistor 51.

As the load circuit of the amplifier 11 comprises conductances in parallel with a "constant current" source (constant that is, with an input signal of a given amplitude), so the circuit of amplifier 11′ comprises resistances in series with a "constant voltage" source. If the sum of the resistance 47 and the effective resistance of the tube 42 bears the same relation to the effective resistance of the rectifier net 45 as the conductance of resistor 25 bears to the conductance of rectifiers 29, the characteristics of the resistors used in each case being the same, the outputs of the two rectifiers will bear the desired reciprocal relation. This requires that resistances 47 both be small in comparison with the minimum resistance of the two rectifiers, and the latter can be increased by using two or more rectifiers in series in each arm of the rectifier net, as shown. Such use of multiple rectifiers also tends toward uniformity, since it is the combination of rectifiers that must be balanced and not individual rectifiers.

Other non-linear elements than rectifiers can be substituted in the circuits shown, provided their response to changes in voltage or current are rapid enough to handle the high frequencies to which they must respond. If their response is symmetrical with respect to voltage or current, single elements can be used instead of two, back-to-back, as in the case of rectifiers. The particular amplifiers shown may not, of themselves give the desired factors $b$ and $1/b$ respectively, but this can be compensated by adjustment of the gain of preceding or succeeeding amplifiers, or by adjusting the gain or attenuation in the linear low frequency channel.

It is to be emphasized that the particular types of reciprocal amplifiers here described is not the only one that can be used or, necessarily, even the best one for a particular service. The description has been included primarily to bring out more forcefully the considerations involved in the design of such a pair of amplifiers and to show how these requirements can be met in a pair of relatively simple construction. The individual components and units described for effecting the method of the invention are not to be considered as limiting its scope, all intended limitations being specifically expressed in the ensuing claims.

It should be appreciated that the system shown in FIGURE 1 can be used for other purposes than to record the signals from the add circuit 15 on the recording medium 19. For example, the signals from the add circuit 15 may be used to modulate the carrier signals from an oscillator (not shown). The modulated carrier signals may be then transmitted on a wireless basis or through coaxial lines to a distant position. At the distant position, the modulated carrier signals may be received and may be detected in a conventional manner to recover the modulating signals corresponding to those obtained from the add circuit 15. The modulating signals from the detector may be then introduced to a stage corresponding to the amplifier 21 in FIGURE 2 to obtain the operation of the stages shown in FIGURE 2.

What is claimed is as follows:

1. In combination for improving the signal-to-noise ratio of a band of signals where noise occurs primarily in a first particular range of said band of signal and where said signals receive a transducing action after said signal-to-noise ratio of said signals in said band has been improved, a filter responsive to said signals in said band to provide a delay for said signals in said band and to pass only the signals in a second particular range forming said band of signals with said signals in said first particular range, a delay line responsive to said signals in said band to provide a delay in said signals in said band corresponding to the delay provided by said filter, a differential amplifier responsive to said signals in said band from said delay line and responsive to said signals in said second particular range from said filter for combining said signals to pass only said signals in said first particular range of said band, a first linear amplifier responsive to said signals in said second particular range of said band to linearly amplify said signals, a non-linear amplifier responsive to said signals in said first particular range of said band from said differential amplifier to produce signals having an output which constitutes a fractional power less than unity of said signals introduced to said amplifier in said first particular range of said band, an add circuit responsive to said signals in said second particular range from said first amplifier and responsive to said signals in said first particular range from said non-linear amplifier to combine said signals, and means responsive to said signals from said add circuit to provide a transducing action on such signals.

2. The combination set forth in claim 1 in which a recording medium is provided and in which said transducing means are constructed to record said signals from said add circuit on said recording medium.

3. In combination an apparatus for improving the signal-to-noise ratio of a band of signals where noise occurs primarily in a first particular range of said band of signals and where said signals receive a transducing action after said signal-to-noise ratio of said signals in said band has been improved, means responsive to said signals in said band to separate said signals in said first particular range of said band from the remaining signals in said band, first amplifier means responsive to said signals separated in said first particular range from said signals in said band to produce output signals having an amplitude which constitutes a fractional power of the amplitude of said output to said amplifier means and which are reduced from a particular maximum level, and second amplifier means responsive to said remaining signals from said separating means for linearly amplifying said remaining signals in said band.

4. The combination set forth in claim 3 in which said second amplifier means are provided with characteristics to amplify said remaining signals from said separating means to levels dependent upon said amplitude levels of said input signals introduced in said first particular range to said first amplifier means.

5. In combination for improving the signal-to-noise ratio of a band of input signals where noise occurs primarily in a first particular range of said band and where said signals in said first particular range are amplified to a particular fractional power less than unity to produce first resultant signals and where the signals in a second particular range forming said band of signals with said first particular range are linearly amplified to produce second resultant signals and where said first and second resultant signals are combined to produce third resultant signals, a filter responsive to said third resultant signals to provide a delay for said resultant signals and to pass only the signals in said second particular range, a delay line responsive to said third resultant signals to provide a delay in said third resultant signals corresponding to the delay provided by said filter, a differential amplifier responsive to said delayed signals from said delay line and to said signals passed by said filter in said second particular range for combining said signals to pass only said signals in said first particular range of said band, a linear amplifier responsive to said signals in said second particular range from said filter for linearly amplifying said signals, a non-linear amplifier responsive to said signals in said first particular range from said differential amplifier for amplifying said signals by a particular power greater than unity and reciprocally related to said particular fractional power, and an add circuit responsive to said signals in said second particular range from said linear amplifier and responsive to said signals in said first particular range from said non-linear amplifier to combine said signals for the production of output signals having characteristics corresponding to said input signals.

6. In combination for improving the signal-to-noise ratio of a band of input signals where noise occurs primarily in a first particular range of said band and where said signals in said first particular range are amplified to a particular fractional power less than unity to produce first resultant signals and where the signals in a second particular range forming said signals in said band with said signals in said first particular range provide second resultant signals and where said first and second resultant signals are combined to produce third resultant signals, means responsive to said third resultant signals for separating said signals in said first particular range from said third resultant signals, amplifier means responsive to said signals separated in said first particular range from said third resultant signals for amplifying said sigals in said first particular range, said amplifier means having gain characteristics proportional to a particular power which is greater than unity and which is inversely related mathematically to the particular fractional power, and means coupling said separating means to said amplifier means to introduce the signals in said first particular range from said separating means to said amplifier means.

7. In combination for improving the signal-to-noise ratio of a band of input signals where noise occurs primarily in a first particular range of said band, a first filter responsive to said signals in said band of input signals to provide a delay for said signals in said band and to pass only the signals in a second particular range forming said band of signals with said signals in said first particular range, a first delay line responsive to said signals in said band to provide a delay in said signals in said band corresponding to the delay provided by said first filter, a first differential amplifier responsive to said signals in said band from said first delay line and responsive to said signals in said second particular range from said first filter for combining said signals to pass only said signals in said first particular range of said band, a first linear amplifier responsive to said signals in said second particular range of said band to linearly amplify said signals, a first non-linear amplifier responsive to said signals in said first particular range of said band from said first differential amplifier to produce signals having an output with an amplitude which constitutes a fractional power less than unity of the amplitude of said signals introduced to said first non-linear amplifier in said first particular range of said band, a first add circuit responsive to said signals in said second particular range from said first linear amplifier and responsive to said signals in said first particular range from said first non-linear amplifier to combine said signals, means responsive to said signals from said first add circuit to provide a transducing action on said signals, a second filter responsive to said signals produced by said transducing means to provide a delay in said transduced signals and to pass only the signals in said second particular range of said transduced signals, a second delay line responsive to said signals produced by said transducing means to provide a delay in said transduced signals corresponding to the delay provided by said second filter, a second differential amplifier responsive to said delayed signals from said second delay line and to said signals passed by said second filter in said second particular range for combining said signals to pass only said signals in said first particular range of said band, a second linear amplifier responsive to said signals in said second particular range from said second filter for linearly amplifying said signals, a second non-linear amplifier responsive to said signals in said first particular range from said second differential amplifier for amplifying the amplitude of said signals by a particular power greater than unity and inversely related to said particular fractional power, and a second add circuit responsive to said signals in said second particular range from said second linear amplifier and responsive to said signals in said first particular range from said second non-linear amplifier to combine said signals for the production of output signals having characteristics corresponding to said input signals.

8. In combination for improving the signal-to-noise ratio of a band of signals where noise occurs primarily in a first particular range of said band of signals and where said signals receive a transducing action after said signal-to-noise ratio of said signals in said band has been improved, means responsive to the signals in said band for separating such signals into first signals in said first particular range and into second signals remaining in said band after the separation of said first signals in said band, first amplifier means responsive to said first signals in said first particular range for providing a particular compression to the amplitudes of all of such signals, second amplifier means responsive to said second signals from said separating means for linearly amplifying such signals in accordance with the compression of said signals in said first partticular range by said first amplifier means, and means responsive to said signals from said first and second amplifier means for combining such signals to produce output signals in said band.

9. The combination set forth in claim 8 in which said output signals from said combining means are adapted to be recorded on a medium and in which means are responsive to said output signals from said combining means for obtaining a recording of such signals on said recording medium.

10. In combination for improving the signal-to-noise ratio of a band of signals where noise occurs primarily in a first particular range of said band of signals and where said signals receive a transducing action after said signal-to-noise ratio of said signals in said band has been improved, means responsive to said signals in said band for separating such signals into signals in said first particular range and signals in a second particular range constituting said band of signals with said signals in said first particular range, first amplifier means responsive to said signals in said first particular range for amplifying such signals to a fractional power less than unity of said signals in said first particular range, and means responsive to said signals from said first amplifier means and the separating means for combining the amplified signals in the first frequency range and the separated signals in the second frequency range to produce output signals in said band.

11. The combination set forth in claim 10 in which said output signals from said combining means are adapted to be recorded on a medium for storage on the medium and for subsequent reproduction and in which transducing means are responsive to said output signals and are disposed relative to said medium to obtain a recording of such signals on said medium.

12. In combination for improving the signal-to-noise ratio of a band of input signals where noise occurs primarily in a first particular range of said band of signals and where the signals receive a transducing action after the signal-to-noise ratio of said signals in said band has been improved, a filter responsive to said input signals in said band for passing the signals in a second particular range forming said band of signals with said signals in said first particular range, means including a differential amplifier responsive to said band of input signals and responsive to said signals from said filter for combining such signals to produce said signals in said first particular range, a non-linear amplifier responsive to said signals in said first particular range for compressing the amplitudes of all of said signals in said first particular range in a particular relationship, and an adding circuit responsive to said signals from said non-linear amplifier and said filter for combining such signals to produce output signals.

13. The combination set forth in claim 12 in which said output signals are adapted to be recorded on a medium having properties for storing such signals for subsequent reproduction and in which means are disposed in cooperative relationship with said medium and are responsive to said output signals to obtain a recording of said output signals on said medium.

14. In combination for improving the signal-to-noise ratio of a band of input signals where noise occurs primarily in a first particular range of said band and where said signals in said first particular range are amplified in a first particular relationship to compress the amplitude of said signals throughout the range of amplitudes and where said signals in said second particular range are combined with said compressed signals in said first particular range to produce first output signals for the transducing of said output signals, filter means responsive to said first output signals for passing the signals in said second particular range, means including a differential amplifier responsive to said first output signals and said signals in said second particular range from said filter means for combining such signals to produce signals in said first particular range, a non-linear amplifier responsive to said signals in said first particular range from said differential amplifier for amplifying such signals in a second particular relationship reciprocal with respect to said first particular relationship to restore said relative amplitudes of said signals to a level corresponding to those in said input signals, and an adding circuit responsive to said signals from said non-linear amplifier and from said filter means for combining such signals to produce second output signals having amplitude characteristics corresponding to those of said input signals.

15. In combination for improving the signal-to-noise ratio of a band of input signals where noise occurs primarily in a first particular range of said band and where said signals in said first particular range are amplified in a first particular relationship to compress the amplitudes of said signals throughout said range of amplitudes and where said signals in said second particular range are combined with said compressed signals in said first particular range to produce output signals for the transducing of said output signals, means responsive to said output signals for separating said output signals into signals in said first particular range and into signals in said second particular range, means responsive to said signals separated in said first particular range from said output signals for amplifying said signals in a second particular relationship reciprocal with respect to the first particular relationship to restore the amplitude characteristics of said signals in said first particular range to the characteristics of said input signals in said first particular range, and means responsive to said amplified signals in said first particular range from said last mentioned means and said signals in said second particular range from said separating means to produce resultant signals having characteristics corresponding to those of said input signals.

References Cited by the Examiner

UNITED STATES PATENTS

| | | | |
|---|---|---|---|
| 2,395,159 | 2/46 | Albin | 330—126 |
| 2,629,784 | 2/53 | Daniels | 179—100.2 X |
| 2,697,758 | 12/54 | Little | 330—126 |
| 2,737,628 | 3/56 | Haines | 330—126 |
| 2,760,011 | 8/56 | Berry | 330—126 |

IRVING L. SRAGOW, *Primary Examiner.*

NEWTON N. LOVEWELL, BERNARD KONICK, *Examiners.*